US009399888B2

(12) United States Patent
Colson et al.

(10) Patent No.: US 9,399,888 B2
(45) Date of Patent: Jul. 26, 2016

(54) METHODS AND APPARATUS TO CONTROL AN ARCHITECTURAL OPENING COVERING ASSEMBLY

(71) Applicant: Hunter Douglas Inc., Pearl River, NY (US)

(72) Inventors: Wendell B. Colson, Weston, MA (US); Daniel M. Fogarty, Framingham, MA (US)

(73) Assignee: Hunter Douglas, Inc., Pearl River, NY (US)

( * ) Notice: Subject to any disclaimer, the term of this patent is extended or adjusted under 35 U.S.C. 154(b) by 35 days.

(21) Appl. No.: 14/213,188

(22) Filed: Mar. 14, 2014

(65) Prior Publication Data

US 2014/0262078 A1 Sep. 18, 2014

Related U.S. Application Data

(60) Provisional application No. 61/786,228, filed on Mar. 14, 2013.

(51) Int. Cl.
*H02P 1/04* (2006.01)
*E06B 9/68* (2006.01)
(Continued)

(52) U.S. Cl.
CPC ... *E06B 9/68* (2013.01); *E06B 9/72* (2013.01); *E06B 9/42* (2013.01); *E06B 9/50* (2013.01); *E06B 2009/6818* (2013.01); *E06B 2009/6872* (2013.01)

(58) Field of Classification Search
CPC ............. E06B 2009/6818; E06B 9/68; E06B 2009/6845; E06B 9/72; E06B 9/11; E06B 9/40; E06B 9/74; E06B 9/82
USPC ......... 318/466, 266, 280, 282, 286, 468, 470, 318/461; 160/34, 84.02, 309, 310, 311
See application file for complete search history.

(56) References Cited

U.S. PATENT DOCUMENTS

| | | | |
|---|---|---|---|
| 3,186,473 | A | 6/1965 | Myers et al. |
| 4,372,367 | A | 2/1983 | Baldanello et al. |

(Continued)

FOREIGN PATENT DOCUMENTS

| | | | |
|---|---|---|---|
| EP | 0783072 | A1 | 7/1997 |
| EP | 07833072 | | 7/1997 |

(Continued)

OTHER PUBLICATIONS

Patent Cooperation Treaty, "International Search Report," issued in connection with Application No. PCT/US2012/000429, mailed Dec. 17, 2012, 3 pages.

(Continued)

*Primary Examiner* — Bentsu Ro
*Assistant Examiner* — Thai Dinh
(74) *Attorney, Agent, or Firm* — Hanley, Flight & Zimmerman, LLC

(57) ABSTRACT

Methods and apparatus to control an architectural opening covering assembly are disclosed herein. An example method disclosed herein includes determining a position of a covering of an architectural opening covering assembly. The example method further includes determining a speed at which the covering is to move via a motor based on the position and a period of time. The example method also includes operating a motor to move the covering at the speed.

21 Claims, 6 Drawing Sheets

(51) Int. Cl.

| | |
|---|---|
| ***E06B 9/72*** | (2006.01) |
| *E06B 9/42* | (2006.01) |
| *E06B 9/50* | (2006.01) |

(56) References Cited

U.S. PATENT DOCUMENTS

| | | | | |
|---|---|---|---|---|
| 4,413,665 | A | 11/1983 | Corcoran | |
| 4,519,554 | A | 5/1985 | Dussoliet et al. | |
| 4,766,941 | A | 8/1988 | Sloop et al. | |
| 4,794,715 | A | 1/1989 | Cherwin | |
| 4,807,686 | A | 2/1989 | Schnebly et al. | |
| 5,547,009 | A | 8/1996 | Plumer | |
| 5,671,387 | A | 9/1997 | Jacobs et al. | |
| 5,848,634 | A | 12/1998 | Will et al. | |
| 6,158,563 | A | 12/2000 | Welfonder et al. | |
| 6,259,218 | B1 | 7/2001 | Kovach et al. | |
| 6,341,638 | B1 | 1/2002 | Thompson et al. | |
| 6,497,267 | B1 | 12/2002 | Azar et al. | |
| 6,571,853 | B1 | 6/2003 | Ciuca et al. | |
| 6,680,594 | B2 | 1/2004 | Collett et al. | |
| 6,810,997 | B2 | 11/2004 | Schreiber et al. | |
| 6,843,301 | B2 | 1/2005 | Carrillo et al. | |
| 6,859,004 | B2 * | 2/2005 | Hormann | E06B 9/68 318/280 |
| 7,466,090 | B2 * | 12/2008 | Meewis | E06B 9/322 160/166.1 |
| 7,599,612 | B2 * | 10/2009 | Moseley | E06B 9/68 160/310 |
| 8,339,086 | B2 * | 12/2012 | Feldstein | E06B 9/42 160/127 |
| 8,575,872 | B2 * | 11/2013 | Mullet | H02P 3/08 160/133 |
| 8,692,498 | B2 * | 4/2014 | Feldstein | E06B 9/42 160/127 |
| 8,853,973 | B2 * | 10/2014 | Lagarde | E06B 9/68 160/310 |
| 9,018,868 | B2 * | 4/2015 | Lucas | E06B 9/72 160/133 |
| 2004/0011477 | A1 | 1/2004 | Walker et al. | |
| 2005/0253710 | A1 | 11/2005 | Eskildsen | |
| 2007/0295460 | A1 * | 12/2007 | Carmen, Jr. | E06B 9/68 160/310 |
| 2008/0283200 | A1 | 11/2008 | Hummel et al. | |
| 2009/0256021 | A1 | 10/2009 | Dorrough | |
| 2010/0018654 | A1 * | 1/2010 | Skinner | E06B 9/322 160/84.02 |
| 2011/0048655 | A1 * | 3/2011 | Andreasen | E06B 9/72 160/310 |

FOREIGN PATENT DOCUMENTS

| | | | |
|---|---|---|---|
| EP | 0940553 | | 9/1999 |
| EP | 0940553 | A2 | 9/1999 |
| WO | 2010011751 | | 1/2010 |
| WO | 2010011751 | A1 | 1/2010 |

OTHER PUBLICATIONS

Patent Cooperation Treaty, "Written Opinion of the International Searching Authority," issued in connection with Application No. PCT/US2012/000429, mailed Dec. 17, 2012, 5 pages.

Patent Cooperation Treaty, "International Search Report," issued in connection with Application No. PCT/US2012/000428, mailed Dec. 21, 2012, 3 pages.

Patent Cooperation Treaty, "Written Opinion of the International Searching Authority," issued in connection with Application No. PCT/US2012/000428, mailed Dec. 21, 2012, 6 pages.

Patent Cooperation Treaty, "International Preliminary Report on Patentability," issued in connection with Application No. PCT/US2011/038469, mailed Dec. 13, 2012, 10 pages.

Patent Cooperation Treaty, "International Search Report," issued in connection with Application No. PCT/US2011/038469, mailed Sep. 23, 2011, 4 pages.

Patent Cooperation Treaty, "Written Opinion of the International Searching Authority," issued in connection with Application No. PCT/US2011/038469, mailed Sep. 23, 2011, 7 pages.

International Bureau, "Notification of Transmittal of the International Search Report and the Written Opinion of the International Searching Authority, or the Declaration," issued in connection with application No. PCT/US2012/000429, mailed on Dec. 17, 2012, 3 pages.

International Bureau, "Written Opinion of the International Searching Authority," issued in connection with application No. PCT/US2012/000429, mailed on Dec. 17, 2012, 5 pages.

International Bureau, "Notification of Transmittal of the International Search Report and the Written Opinion of the International Searching Authority, or the Declaration," issued in connection with application No. PCT/US2012/000428, mailed on Dec. 21, 2012, 3 pages.

International Bureau, "Written Opinion of the International Searching Authority," issued in connection with application No. PCT/US2012/000428, mailed on Dec. 21, 2012, 3 pages.

International Bureau, "Notification Concerning Transmittal of International Preliminary Report on Patentability (Chapter I of the Patent Cooperation Treaty)," issued in connection with application No. PCT/US2011/038469, mailed on Dec. 13, 2012, 10 pages.

International Bureau, "Notification of Transmittal of the International Search Report and the Written Opinion of the International Searching Authority, or the Declaration," issued in connection with application No. PCT/US11/38469, mailed on Sep. 23, 2011, 4 pages.

International Bureau, "Written Opinion of the International Searching Authority," issued in connection with application No. PCT/US11/38469, mailed on Sep. 23, 2011, 7 pages.

* cited by examiner

METHODS AND APPARATUS TO CONTROL AN ARCHITECTURAL OPENING COVERING ASSEMBLY

RELATED APPLICATIONS

This patent claims priority to U.S. Provisional Application Ser. No. 61/786,228, titled "METHODS AND APPARATUS TO CONTROL AN ARCHITECTURAL OPENING COVERING ASSEMBLY," filed on Mar. 14, 2013, which is hereby incorporated by reference herein in its entirety.

FIELD OF THE DISCLOSURE

This disclosure relates generally to architectural opening covering assemblies and, more particularly, to methods and apparatus to control an architectural opening covering assembly.

BACKGROUND

Architectural opening covering assemblies such as roller blinds provide shading and privacy. Such assemblies generally include a motorized roller tube connected to covering fabric or other shading material. As the roller tube rotates, the fabric winds or unwinds around the tube to uncover or cover an architectural opening.

Figure 1:
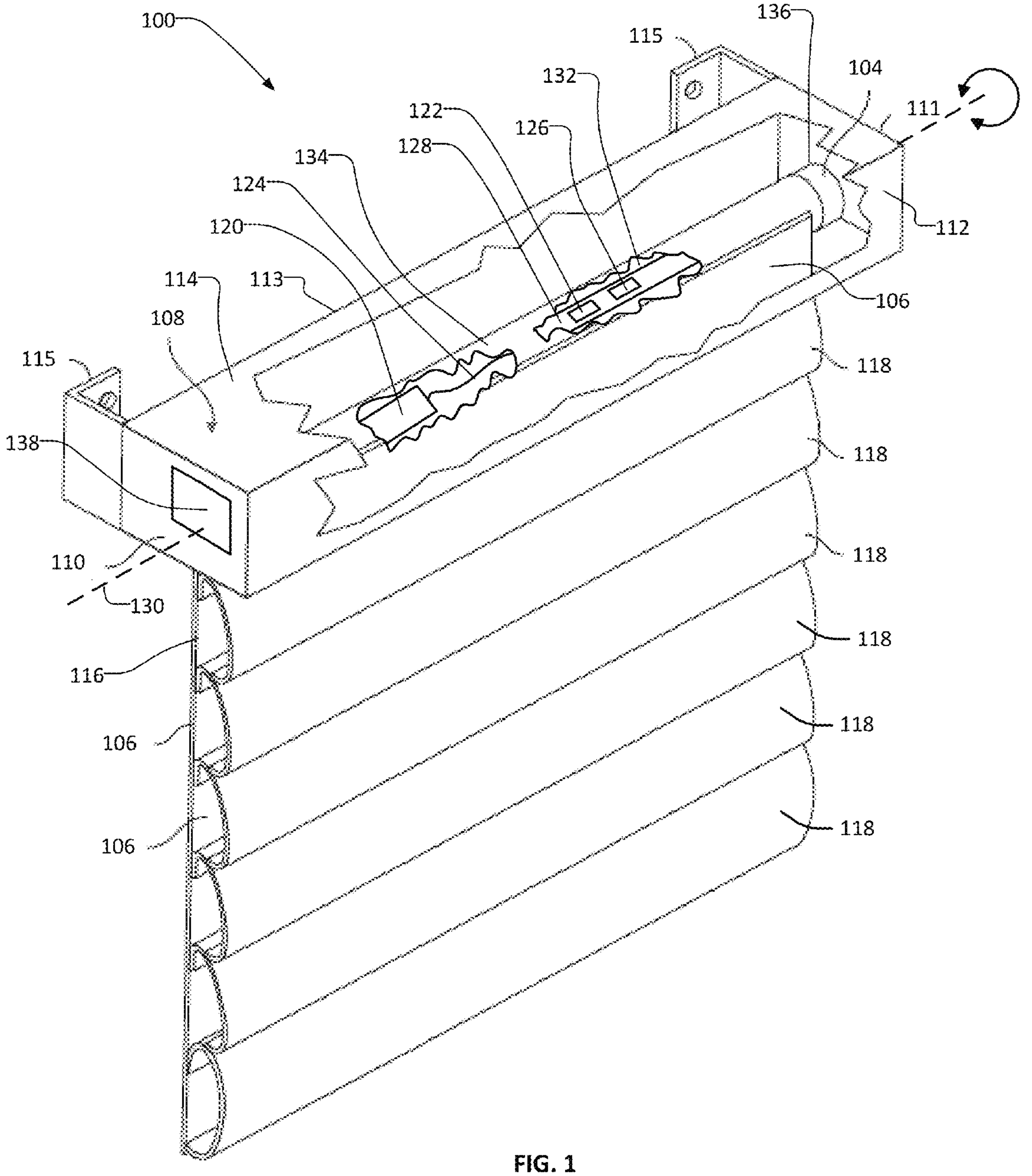
FIG. 1 is an isometric illustration of an example architectural opening covering assembly in which aspects of the present disclosure may be implemented.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, means that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Methods and apparatus to control an architectural opening covering assembly are disclosed herein. An example method disclosed herein includes determining a position of a covering of an architectural opening covering assembly, and determining a speed at which the covering is to move via a motor based on the position and a period of time. The example method also includes operating the motor to move the covering at the speed.

An example tangible computer readable storage medium disclosed herein includes instructions that, when executed, cause a machine to at least determine a distance of a portion of a covering of an architectural opening covering assembly from a reference position and determine a speed at which the covering is to move via a motor based on the distance and a period of time. The example instructions also cause the machine to at least operate the motor to move the covering at the speed.

An example apparatus disclosed herein includes a motor operatively coupled to a tube of an architectural opening covering assembly. The example tube is to support an architectural opening covering. The example apparatus also includes a sensor to determine an angular position of the tube. The example apparatus further includes a controller to determine a speed at which the motor is to rotate the tube based on the angular position of the tube and a period of time.

An example controller of an architectural opening covering assembly is disclosed herein. The example architectural opening covering assembly includes a motor to rotate a tube, and a covering at least partially wound around the tube. The example controller includes a motor controller to control the motor. The example controller also includes a tube angular position determiner to determine an angular position of the tube. The example controller further includes a tube rotational speed determiner to determine a speed at which the motor is to rotate the tube based on a period of time and the angular position of the tube relative to a reference position.

Example architectural opening covering assemblies disclosed herein may be controlled by one or more controllers. In some examples, a controller is communicatively coupled to a motor, which rotates a tube to wind or unwind (e.g., raise or lower) a covering wound at least partially around the tube. The example controllers disclosed herein control speeds at which the coverings move via the motors based on visual appearances of the architectural opening covering assemblies during a speed setting mode. For example, some example controllers disclosed herein enable the speeds at which the coverings are moved via the motors (e.g., rotational speeds at which motors rotate the tubes to wind or unwind the coverings) to be established (e.g., determined and/or set) based on a position of the covering relative to a reference position (e.g., a fully unwound position of the covering, a lower limit position of the covering, an upper limit position of the covering, etc.). When some example controllers disclosed herein are in the speed setting mode, the positions of the coverings may be individually adjusted via input devices to desired positions (e.g., speed setting positions). For example, the position of the covering may be adjusted by control of the motor, operation of manual controls such as pull cords, physically positioning the covering by raising or pulling on the covering, and so forth. Based on the desired positions of the coverings, the controllers determine and/or set the speeds at which the motors are to move the coverings.

For example, if each of the coverings are moved to substantially the same position (e.g., a given distance from the fully unwound positions of the coverings), the controllers establish substantially the same speed at which the coverings are to move during operation (e.g., even if the tubes on which the coverings are wound are different sizes). In this manner, a plurality of example architectural opening covering assemblies disclosed herein may be coordinated to move their coverings in unison. In some examples, if the positions of the coverings are moved to different positions, the controllers establish different speeds at which the motors are to move the tubes and, thus, the coverings during operation. For example, if a first covering is moved to a first position that is three times as far from a reference position as a second position of a second covering, the motor operatively coupled to the first covering may move the first covering three times faster than a motor operatively coupled to the second covering.

FIG. 1 is an isometric illustration of an example architectural opening covering assembly 100 in accordance with the teachings of this disclosure. The example architectural opening covering assembly 100 of FIG. 1 is merely an example and, thus, other architectural opening covering assemblies may be used to implement the example methods and/or apparatus disclosed herein. For example, the architectural opening covering assemblies described in the following applications may be used: U.S. Provisional Application Ser. No. 61/542,760, entitled "CONTROL OF ARCHITECTURAL OPENING COVERINGS," filed Oct. 3, 2011; U.S. Provisional Application Ser. No. 61/648,011, entitled "METHODS AND APPARATUS TO CONTROL ARCHITECTURAL OPENING COVERING ASSEMBLIES," filed May 16, 2012; International Application No. PCT/US2012/000428, entitled "METHODS AND APPARATUS TO CONTROL ARCHITECTURAL OPENING COVERING ASSEMBLIES," filed on Oct. 3, 2012; and U.S. International Application No. PCT/US2012/000429, entitled "METHODS AND APPARATUS TO CONTROL ARCHITECTURAL OPENING COVERING ASSEMBLIES," filed on Oct. 3, 2012, the disclosures of which are hereby incorporated herein by reference in their entirety.

In the example of FIG. 1, the covering assembly 100 includes a headrail 108. The headrail 108 is a housing having opposed end caps 110, 111 joined by front 112, back 113 and top sides 114 to form an open bottom enclosure. The headrail 108 also has mounts 115 for coupling the headrail 108 to a structure above or behind an architectural opening such as a wall via mechanical fasteners such as screws, bolts, etc. A roller tube 104 is disposed between the end caps 110, 111. Although a particular example of a headrail 108 is shown in FIG. 1, many different types and styles of headrails exist and could be employed in place of the example headrail 108 of FIG. 1. Indeed, if the aesthetic effect of the headrail 108 is not desired, it can be eliminated in favor of mounting brackets.

In the example illustrated in FIG. 1, the architectural opening covering assembly 100 includes a covering 106, which is a cellular type of shade. In this example, the covering 106 includes a unitary flexible fabric (referred to herein as a "backplane") 116 and a plurality of cell sheets 118 that are secured to the backplane 116 to form a series of cells. The cell sheets 118 may be secured to the backplane 116 using any desired fastening approach such as adhesive attachment, sonic welding, weaving, stitching, etc. The covering 106 shown in FIG. 1 can be replaced by any other type of covering including, for instance, single sheet shades, blinds, other cellular coverings, and/or any other type of covering. In the illustrated example, the covering 106 has an upper edge mounted to the roller tube 104 and a lower, free edge. The upper edge of the example covering 106 is coupled to the roller tube 104 via a chemical fastener (e.g., glue) and/or one or more mechanical fasteners (e.g., rivets, tape, staples, tacks, etc.). The covering 106 is movable between a raised position and a lowered position (illustratively, the position shown in FIG. 1). When in the raised position, the covering 106 is wound about the roller tube 104.

The example architectural opening covering assembly 100 is provided with a motor 120 to move the covering 106 between the raised and lowered positions. The example motor 120 is controlled by a controller 122. In the illustrated example, the controller 122 and the motor 120 are disposed inside the tube 104 and communicatively coupled via a wire 124. Alternatively, the controller 122 and/or the motor 120 may be disposed outside of the tube 104 (e.g., mounted to the headrail 108, mounted to the mounts 115, located in a central facility location, etc.) and/or communicatively coupled via a wireless communication channel. As described in greater detail below, the example controller 122 controls speeds at which the covering 106 moves relative to an architectural opening.

The example architectural opening covering assembly 100 of FIG. 1 includes a tube angular position sensor 126 communicatively coupled to the controller 122. In the illustrated example, the tube angular position sensor 126 is a gravitational sensor (e.g., an accelerometer, the gravitational sensor made by Kionix® as part number KXTC9-2050, etc.). In other examples, the tube angular position sensor may include one or more other types of sensors (e.g., a potentiometer, a Hall Effect type sensor, a resolver, a rotary encoder employing, for example, light, a magnet, and/or any other type of angular position sensor). The example tube angular position sensor 126 of FIG. 1 is coupled to the tube 104 via a mount 128 to rotate with the tube 104. In the illustrated example, the tube angular position sensor 126 is disposed inside the tube 104 along an axis of rotation 130 of the tube 104 such that an axis of rotation of the tube angular position sensor 126 is substantially coaxial to the axis of rotation 130 of the tube 104. In the illustrated example, a central axis of the tube 104 is substantially coaxial to the axis of rotation 130 of the tube 104, and a center of the tube angular position sensor 126 is on (e.g., substantially coincident with) the axis of rotation 130 of the tube 104. In other examples, the tube angular position sensor 126 is disposed in other locations such as, for example, on an interior surface 132 of the tube 104, on an exterior surface 134 of the tube 104, on an end 136 of the tube 104, on the covering 106, and/or any other suitable location. The example tube angular position sensor 126 generates tube position information, which is used by the controller 122 to determine an angular position of the tube 104 and/or monitor movement of the tube 104 and, thus, the covering 106. In some examples, the tube position information includes values corresponding to a position of the covering 106. In some examples, the controller 122 controls an angular position of the tube 104 and/or a speed of rotation of the tube 104 based on the tube position information.

In some examples, the architectural opening covering assembly 100 is operatively coupled to an input device 138, which may be used to automatically and/or selectively move the covering 106 between the raised and lowered positions. In some examples, the input device 138 sends a signal to the controller 122 to enter a programming mode (e.g., a speed setting mode) in which a speed of rotation of the tube 104 is determined, set and/or recorded. In some examples, one or more positions (e.g., a lower limit position, an upper limit position, a position between the lower limit position and the upper limit position, etc.) of the covering 106 are determined and/or recorded when the controller 122 enters the program mode. In the case of an electronic signal, the signal may be sent via a wired or wireless connection.

In some examples, the input device 138 is a mechanical input device such as, for example, a cord, a lever, a crank, and/or an actuator coupled to the motor 120 and/or the tube 104 to apply a force to rotate the tube 104. In some examples, the input device 138 is implemented by the covering 106 and, thus, the input device 138 is eliminated (e.g., the covering 106 is lowered by pulling the covering 106 downward and the covering 106 is raised by lifting the covering 106). In some examples, the input device 138 is an electronic input device such as, for example, a switch, a light sensor, a computer, a central controller, a smartphone, and/or any other device capable of providing instructions to the motor 120 and/or the controller 122 to raise or lower the covering 106. In some examples, the input device 138 is a remote control, a smart phone, a laptop, and/or any other portable communication device, and the controller 122 includes a receiver to receive signals from the input device 138. Some example architectural opening covering assemblies include other numbers of input devices (e.g., 0, 2, etc.).

In some examples, the input device 138 is disposed on the architectural opening covering assembly 100. In other examples, the input device 138 is not disposed on the architectural opening covering assembly 100 (e.g., the input device 138 is disposed in a control room of a building in which the architectural opening covering assembly 100 is employed) and is remotely communicatively coupled to the controller 122 via, for example, wires, a wireless transmitter, and/or other manner. The example architectural opening covering assembly 100 may include any number and combination of input devices.

In some examples, a speed at which the covering 106 is raised and/or lowered via the motor 120 is determined, set and/or recorded (e.g., stored in a memory) during a speed setting mode (e.g., a programming or calibration mode). The example controller 122 of FIG. 1 enters the speed setting mode in response to a first command from the input device 138. When the example controller 122 is in the speed setting mode, a user may move (e.g., raise or lower) the covering 106 to a desired position (e.g., a speed setting position) a given distance away from a reference position such as, for example, a fully unwound position, a lower limit position, an upper limit position, a previously stored position, and/or any other position. In some examples, the reference position is determined during the speed setting mode. In other examples, the reference position is previously determined and/or recorded during, for example, a programming mode described in U.S. Provisional Application Ser. No. 61/648,011, International Application No. PCT/US2012/000428, and/or U.S. International Application No. PCT/US2012/000429. The example controller 122 monitors the angular positions of the tube 104 based on the tube position information generated by the example tube angular position sensor 126 to determine the position of the covering 106 as the covering 106 is moved to the speed setting position.

In response to a second command from the input device 138, the example controller 122 establishes (e.g., determines, sets and/or records) a speed at which the motor 120 is to rotate the tube 104 based on the speed setting position of the covering 106. In some examples, the rotational speed of the tube 104 is determined by dividing a number of rotations of the tube 104 from the reference position to the speed setting position by a predetermined value. For example, the predetermined value may be an amount of time over which the covering 106 is to move the distance from the reference position to the speed setting position (e.g., ten seconds, twenty seconds, etc). For example, if the speed setting position is ten revolutions of the tube 104 away from the reference position and the predetermined amount of time is 15 seconds, the controller 122 determines, sets and/or stores the rotational speed at which the motor 120 is to rotate the tube 104 to be ten revolutions per fifteen seconds (i.e., 40 revolutions per minute). As a result, during operation of the example architectural opening covering assembly 100 of FIG. 1, the example covering 106 raises and/or lowers at a speed corresponding to 40 revolutions of the tube 104 per minute.

Figure 2:
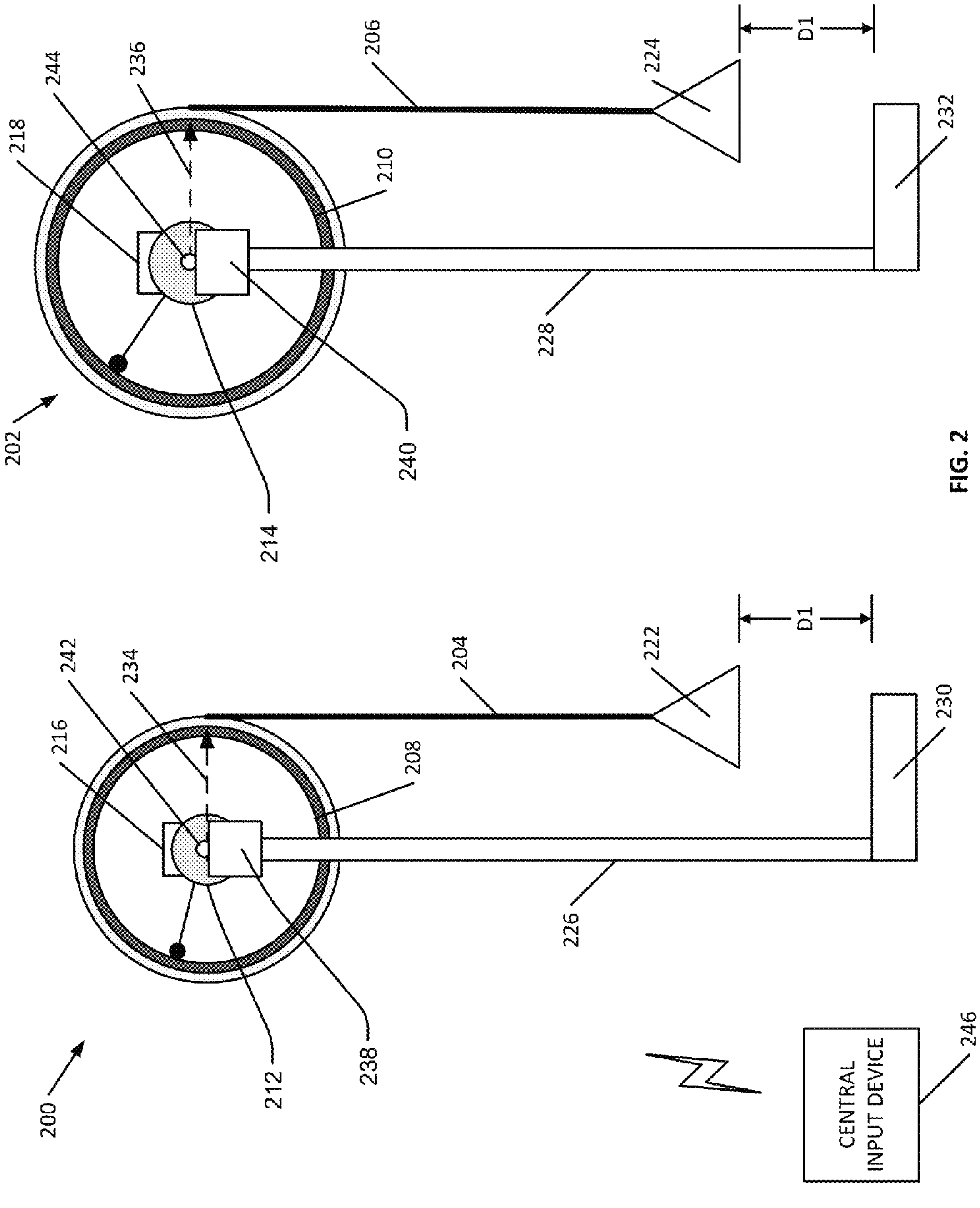
FIG. 2 is a side, schematic view of an example first architectural opening covering assembly and an example second architectural opening covering assembly having coverings at the same speed setting position.

FIG. 2 is a side, schematic view of a first architectural opening covering assembly 200 and a second architectural opening covering assembly 202 disclosed herein. The example architectural opening covering assembly 200 and/or the example architectural opening covering assembly 202 may be implemented using the example architectural opening covering of FIG. 1. The example architectural opening covering assemblies 200, 202 may be located in the same room or building, positioned along a wall, and/or any other locations. As described in greater detail below, the example first architectural opening covering assembly 200 and the example second architectural opening covering assembly 202 are different sizes but are otherwise substantially similar.

In the illustrated example, the architectural opening covering assemblies 200, 202 of FIG. 2 each include the following: a covering 204, 206 at least partially wound about a tube 208, 210; a motor 212, 214 operatively coupled to the tube 208, 210; and a controller 216, 218 to control the motor 212, 214. The example coverings 204, 206 each include an end rail 220, 222 to provide stability to the example coverings 204, 208. The example architectural opening covering assemblies 200, 202 are each supported by a frame 226, 228 having a sill extending from the frame 226, 228 into a path of the end rail 222, 224. For example, if the coverings 204, 206 are lowered a given distance, the end rails 220, 224 of the coverings 204, 206 contact the sills 230, 232, respectively.

In the illustrated example, the sills 230, 232 are at substantially similar heights relative to, for example, a floor. However, the example architectural opening covering assemblies 200, 202 of FIG. 2 are different sizes. For example, in the illustrated example, a first radius 234 of the tube 208 of the first architectural opening covering assembly 200 is less than a second radius 236 of the tube 210 of the example second architectural opening covering assembly 202. In some examples, an amount of the covering 204 wound around the tube 208 (e.g., a number of layers formed by the covering 204 wound around the tube 208) and/or a thickness of the covering 204 (e.g., a sheet thickness) is different than an amount of the covering 206 wound around the tube 210 and/or a thickness of the covering 206. Also, the example frames 226, 228 support the example architectural opening covering assemblies 200, 202 at different heights (e.g., axes of rotation of the first tube 208 and the second tube 210 are at different distances from the respective sills 230, 232). In other examples, the frames 226, 228 and/or the architectural opening covering assemblies 200, 202 are substantially the same size, supported at substantially the same height and/or the coverings 204, 206 have substantially the same thickness.

The example architectural opening covering assemblies 200, 202 include a local input device 238, 240. In the illustrated example, the local input devices 238, 240 are substantially similar to the example input device 138 of FIG. 1. Thus, the example local input devices 238, 240 may be input devices operatively coupled to the tubes 208, 210 and/or the motors 212, 214 (e.g., a cord, crank, actuator, etc.) and/or input devices communicatively coupled to the controllers 216, 218 and/or the motors 212, 214 (e.g., a switch, a remote control, etc.), respectively, that enable a user to operate the respective architectural opening covering assemblies 200, 202 (e.g., a user may raise and/or lower the covering 304 via the local input device 238, and the user may raise or lower the covering 206 via the local input device 240).

The example controllers 216, 218 of FIG. 2 are substantially similar to and/or may be implemented using the example controller 122 of FIG. 1. Thus, the example controllers 216, 218 of FIG. 2 monitor angular positions of the tubes 208, 210 via tube angular position sensors 242, 244 (e.g., gravitational sensors and/or any other type of angular position sensors), determine positions of the coverings 204, 206, determine rotational speeds of the tubes 208, 210, etc. In the illustrated example, the example controllers 216, 218 are communicatively coupled to a central input device 246 such as, for example an input device similar to or identical to the example input device 138 of FIG. 1. In some examples, the central input device 246 is located remotely relative to the architectural opening covering assemblies 200, 202 of FIG. 2. For example, the central input device 246 may be located in a different room than one or both of the architectural opening covering assemblies 200, 202.

In the illustrated example, the controllers 216, 218 receive a first command from the central input device 246 to enter a speed setting mode. In some examples, the first command is transmitted in response to a user action (e.g., pressing a button). In the illustrated example, the speeds at which the coverings 204, 206 are to move during operation are independently established while each of the controllers 216, 218 are in the speed setting mode. In some examples, a user may coordinate the speeds at which the coverings 204, 206 are to move during operation based on visual appearances of the respective architectural opening covering assemblies 200, 202 such as, for example, distances of the end rails 222, 224 from the sills 230, 232, a distance between the end rail 222 and the end rail 224, and/or other positions of the coverings 204, 206. For example, the coverings 204, 206 may be horizontally aligned to establish substantially the same speed at which the coverings 204, 206 are to move during operation or the coverings 206, 206 may be spaced apart vertically to establish different speeds at which the coverings 204, 206 are to move during operation.

In the illustrated example, the reference positions of the coverings 204, 206 are lower limit positions. In other examples, the reference positions are other positions (e.g., upper limit positions, fully unwound positions, and/or any other positions). In the illustrated example, the lower limit positions and thus, the reference positions of the coverings 204, 206 are positions of the coverings 204, 206 at which the end rails 222, 224 contact the sills 230, 232, respectively. Further, while the example coverings 204, 206 of FIG. 2 have substantially the same reference position, in other examples the coverings 204, 206 have different reference positions from each other. For example, the reference position utilized by the example controller 216 may be the lower limit position of the covering 204, and the reference position utilized by the controller 218 may be the upper limit position of the covering 206. In some examples, the reference positions are established during the speed setting mode. In other examples, the reference positions are previously established during a programming mode such as one or more of the programming modes described in U.S. Provisional Application Ser. No. 61/648,011, International Application No. PCT/US2012/000428, and/or U.S. International Application No. PCT/US2012/000429.

While the example controllers 216, 218 are in the speed setting mode, the coverings 204, 206 may be moved to speed setting positions that are desired distances away from the reference positions. For example, the user may operate the local input devices 238, 240 to move the coverings 204, 206 relative to the reference positions. In some examples, the controllers 216, 218 monitor movement and/or angular positions of the tubes 208, 210, respectively (e.g., relative to the reference position and/or other position(s)), in a manner similar or identical to the example controller 122 of FIG. 1 disclosed above and/or in a manner described in U.S. Provisional Application Ser. No. 61/648,011, International Application No. PCT/US2012/000428, and/or U.S. International Application No. PCT/US2012/000429. In the illustrated example, the controllers 216, 218 determine the speed setting positions based on the angular positions of the tubes 208, 210 when the central input device 246 communicates a second command. The coverings 204, 206 illustrated in FIG. 2 are in speed setting positions a first distance D1 away from the sills 230, 232, respectively. Thus, in the illustrated example, the speed setting positions of the coverings 204, 206 are substantially the same distance away from the respective reference positions of the coverings 204, 206.

Once the example controllers 216, 218 receive the second command from the example central input device 246 (e.g., in response to a user action), the controllers 216, 218 establish the speeds at which the example coverings 204, 206 are to be moved via the motors 212, 214 during operation. In the illustrated example, the controllers 216, 218 establish the speeds based on the speed setting positions of the coverings 204, 206. In the illustrated example, the controller 216 of the first architectural opening covering assembly 200 determines that the covering 204 is to move at a speed substantially equivalent to moving the first distance D1 in a predetermined amount of time (e.g., 15 seconds, 20 seconds, 30 seconds, etc.). Likewise, the controller 218 of the second architectural opening covering assembly 202 determines that the covering 206 is to move at a speed substantially equivalent to the first distance D1 in the predetermined amount of time. For example, if the predetermined amount of time is ten seconds and the first distance D1 is one foot, the controllers 216, 218 determine that the coverings 204, 206 are to be moved via the motors 212, 214 (e.g., be raised or lowered by the motor 212, 214) at a speed of approximately one foot per ten seconds.

Although the same predetermined amount of time is used by the controller 216 of the first architectural opening covering assembly 200 and the controller 218 of the second architectural opening covering assembly 202 of FIG. 2 in the illustrated example, in other examples the first controller 216 and the second controller 218 use different predetermined amounts of time to determine the speeds at which the coverings 204, 206, respectively, are to move during operation. In some examples, the predetermined amounts of time are established during the example speed setting mode. In other examples, the controller 216 and/or the controller 218 utilizes one or more previously stored predetermined amounts of time.

In some examples, the controllers 216, 218 determine the speeds based on a number of revolutions of the tubes 208, 210 corresponding to the first distance D1. For example, if the controller 216 of the first architectural opening covering assembly 200 determines that the first distance D1 corresponds to one revolution of the tube 208 (e.g., the tube 208 in the speed setting position is one revolution away from the reference position), the controller 216 determines that a rotational speed at which the motor 212 is to rotate the tube 208 is one revolution per ten seconds. If the example controller 218 of the second architectural opening covering assembly 202 determines that the first distance D1 corresponds to 0.75 revolutions of the tube 210 (e.g., the tube 210 in the speed setting position is 0.75 revolutions away from the reference position), the controller 218 determines that a rotational speed at which the motor 214 is to rotate the tube 210 is 0.75 revolution per ten second. In some examples, the controllers 216, 218 determine the speeds of the coverings 204, 206 in other units of measurement (e.g., revolutions per minute, etc.).

Thus, by positioning the coverings 204, 206 of the example architectural opening covering assemblies 200, 202 of FIG. 2 to desired positions during the speed setting mode, the speeds at which the coverings 204, 204 are to move during operation of the example architectural opening covering assemblies 200, 202 are configured. In the illustrated example of FIG. 2, by aligning the example rails 222, 224 of the coverings 204, 206 to the same height during the speed setting mode, the speeds at which the coverings 204, 206 will move during operation will substantially match. More specifically, in the illustrated example, by moving the coverings 204, 206 to the same speed setting positions during the speed setting mode, the motors 212, 214 rotate the differently sized tubes 208, 210 at different speeds to raise and lower the coverings 204, 206 at substantially the same speed. As a result, the coverings 204, 206 may move substantially in unison in response to a command from the central input device 246 to move the coverings 204, 206 to a given position (e.g., an upper limit position, a lower limit position, an intermediate position, etc.). In this manner, the user may coordinate the speeds at which coverings of a plurality of architectural opening covering assemblies (e.g., located along a side of a building, in a room, etc.) raise and lower based on the visual appearance (e.g., covering positions) of the architectural opening covering assemblies.

Figure 3:
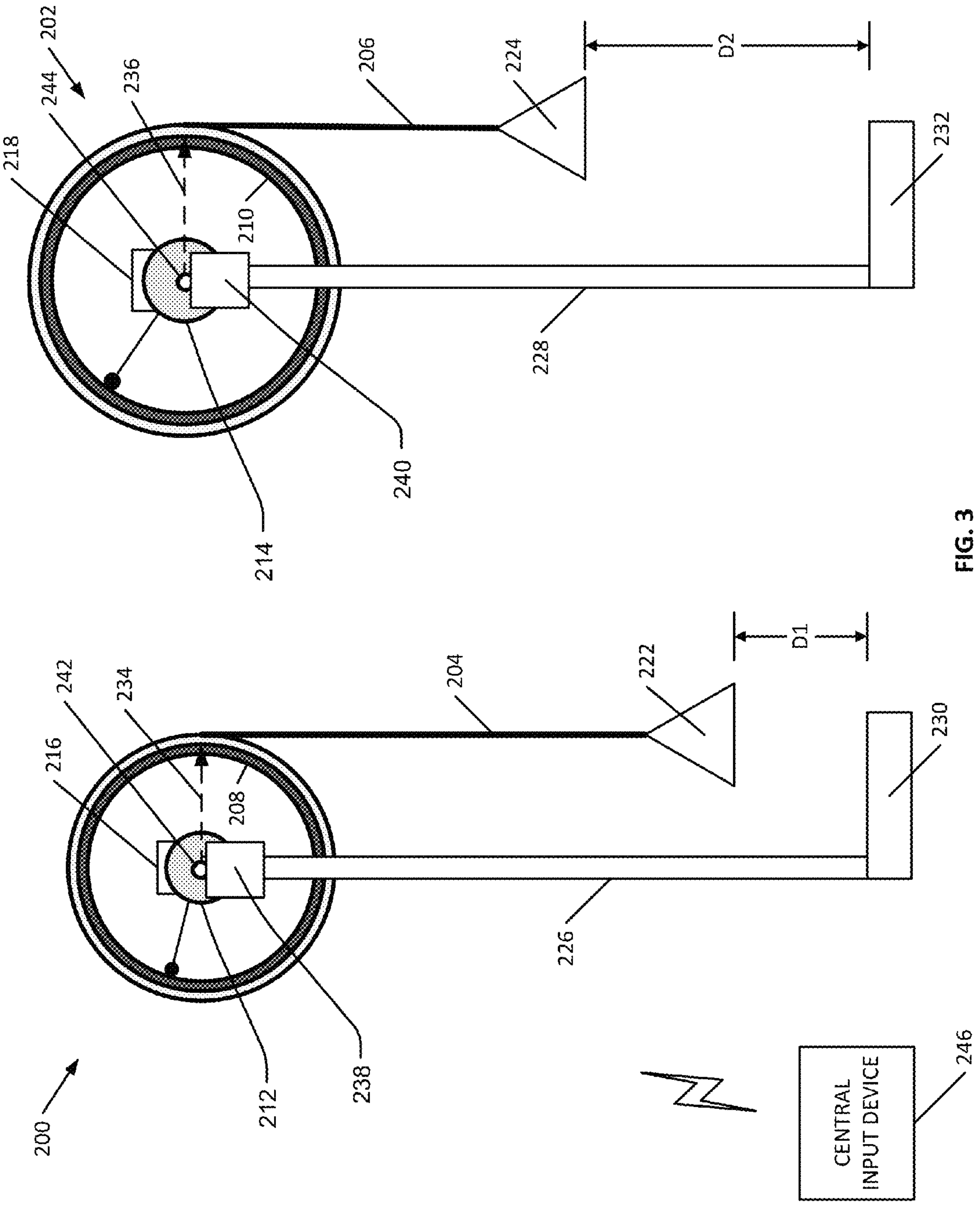
FIG. 3 is a side, schematic view of the example first architectural opening covering assembly and the example second architectural opening covering assembly of FIG. 2 having coverings at different speed setting positions.

FIG. 3 illustrates the example architectural opening covering assemblies 200, 202 of FIG. 2 at different speed setting positions during the speed setting mode. In the illustrated example, the covering 204 of the first architectural opening covering assembly 200 is at a first speed setting position that is the first distance D1 from the reference position (e.g., the lower limit position). Thus, in response to a command from the central input device 246 to establish the speed at which the motor 212 is to move the covering 204 during operation, the controller 216 establishes the speed based on a number of rotations of the tube 208 to move the covering 204 the first distance D1 in a predetermined amount of time. In the illustrated example, if the predetermined amount of time is ten seconds and the covering 204 moves the first distance D1 in one revolution of the tube 208, the example controller 216 determines that the speed at which the tube 208 is to rotate during operation of the example architectural opening covering assembly 200 is one revolution per ten seconds (i.e., six revolutions per minute).

The covering 206 of the example second architectural opening covering assembly 202 is raised (e.g., via the local input device 240) to a second speed setting position that is a second distance D2 away from the reference position (e.g., the lower limit position). Thus, the example controller 218 establishes the speed at which the motor 214 is to move the covering 206 during operation based on a number of rotations of the tube 210 to move the covering 206 the second distance D2 (from the second speed setting position to the reference position) in a predetermined amount of time. In the illustrated example, if the predetermined amount of time is ten seconds and the second distance D2 corresponds to 1.5 revolutions of the tube 210, the example controller 216 determines that the speed at which the tube 210 is to rotate via the motor 214 during operation of the example architectural opening covering assembly 202 is 1.5 revolutions per ten seconds (i.e., nine revolutions per minute).

By moving the example coverings 204, 206 to different speed setting positions during the speed setting mode in the illustrated example of FIG. 3, the speeds at which the coverings 204, 206 move via the motors 212, 214 are configured such that the speeds are different. More specifically, because the reference position utilized by the example controllers 216, 218 are substantially at the same height (e.g., relative to a floor) in the illustrated example, a difference between the speeds at which the coverings 204, 206 are determined to move is based on a distance between the speed setting positions (D1, D2) of the coverings 204, 206. For example, if the second distance D2 is twice the first distance D1, the covering 206 of the second example architectural opening covering assembly 202 moves twice as fast as the covering 204 of the first architectural opening covering assembly 200 during operation.

Figure 4:
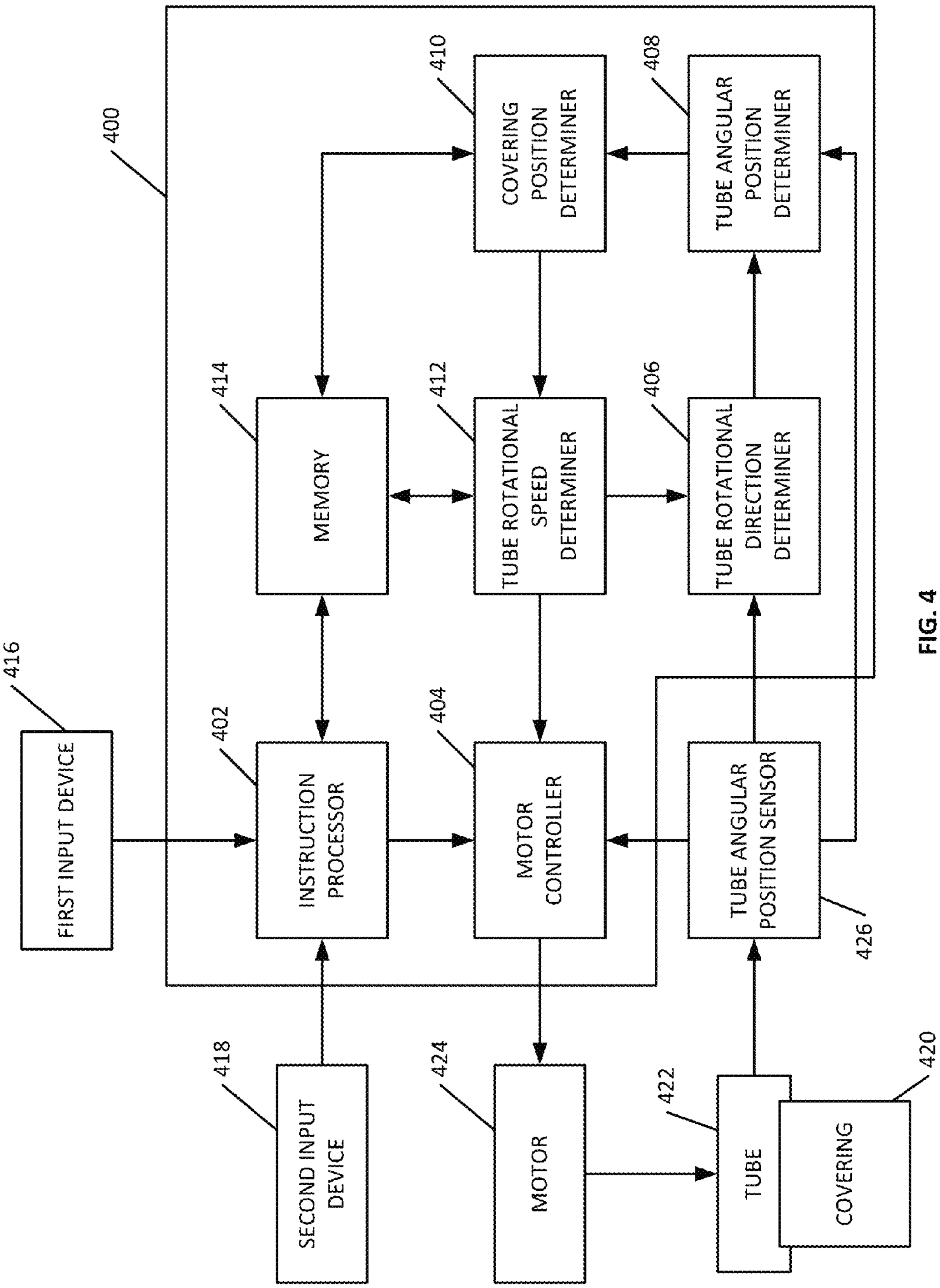
FIG. 4 is a block diagram of an example controller disclosed herein, which may be used to control operation of the example architectural opening covering assembly of FIG. 1, the example first architectural opening covering assembly of FIGS. 2-3 and/or the example second architectural opening covering assembly of FIGS. 2-3.

FIG. 4 is a block diagram of an example controller 400 disclosed herein, which implements the example controller 122 of FIG. 1, the example controller 216 of FIGS. 2-3 and/or the example controller 218 of FIGS. 2-3. In the illustrated example, the controller 400 includes an instruction processor 402, a motor controller 404, a tube rotational direction determiner 406, a tube angular position determiner 408, a covering position determiner 410, a tube rotational speed determiner 412 and a memory 414.

The example instruction processor 400 of FIG. 4 receives instructions or commands from a first input device 416 (e.g., the input device 138 of FIG. 1, the local input device 238 of FIG. 2, the local input device 240 of FIG. 2, etc.) and/or a second input device 418 (e.g., the central input device 246 and/or any other input device). In some examples, a polarity of a voltage source (e.g., a power supply provided by the first input device 416 and/or the second input device 418) is modulated (e.g., alternated) to communicate one or more instructions. The instructions may include a command to, for example lower a covering 420, raise the covering 420, enter the speed setting mode, move the covering 420 at a given speed, and/or other instructions. In some examples, the first input device 416 and/or the second input device 418 sends a signal (e.g., RF signals, network communications, etc.), which corresponds to a client action (e.g., raise the covering 420, lower the covering, enter the speed setting mode, move the covering 420 at a given speed, etc.). The example instruction processor 402 determines which of a plurality of actions are instructed by the signal and/or communication transmitted from the first input device 416 and/or the second input device 418. In some examples, the first input device 416 and/or the second input device 418 instructs the example instruction processor 402 to store a given position of a tube 422 (e.g., an angular position) as a reference position (e.g., a lower limit position, an upper limit position, a position between the upper limit position and the lower limit position, etc.) in the memory 414.

The example motor controller 404 of FIG. 4 controls a motor 424 (e.g., the example motor 120, the example motor 212, the example motor 214, etc.). For example, the example motor controller 404 of FIG. 4 sends a signal to the motor 424 to cause the motor 424 to operate the covering 420 (e.g., rotate the tube 422 to raise or lower the covering 420, prevent (e.g., brake, stop, etc.) rotation of the tube 422, etc.). The example motor controller 404 also controls a speed at which the motor 424 rotates the tube 422 rotates during operation of an example architectural opening covering assembly (e.g., the example architectural opening covering assembly 100, the example first architectural opening covering assembly 200 of FIG. 2, the example second architectural opening covering assembly 202 of FIG. 2, etc.). In some examples, the motor controller 404 controls the speed of rotation of the tube 422 via a speed controller such as, for example, a pulse width modulation speed controller, a brake, a voltage rectifier that supplies a voltage (e.g., power) to the motor 424 and/or any other component or device for operating the motor 424 and/or the tube 422.

The example tube rotational direction determiner 406 of FIG. 4 determines a direction of rotation (e.g., clockwise or counterclockwise) of the tube 422. In some examples, the tube rotational direction determiner 406 determines the direction of rotation of the tube 422 based on tube position information communicated by a tube angular position sensor 426 (e.g., the tube angular position sensor 122 of FIG. 1, the example tube angular position sensor 242 of FIG. 2, the example tube angular position sensor 244 of FIG. 2, etc.). In some examples, the tube angular position sensor 426 of FIG. 4 is a gravitational sensor (e.g., an accelerometer, the gravitational sensor made by Kionix® as part number KXTC9-2050, etc.). In other examples, the tube angular position sensor 426 may include one or more other types of sensors (e.g., a potentiometer, a Hall Effect type sensor, a resolver, rotary encoder employing, for example, light, a magnet, and/or any other type of angular position sensor). In some examples, the tube angular position sensor 426 outputs a plurality of values as the tube 422 rotates. In some examples, based on how those values are changing (e.g., increasing or decreasing, changing signs (e.g., positive to negative, negative to positive, etc.)), the tube rotational direction determiner 406 determines the direction of rotation of the tube 422. In some examples, the tube rotational direction determiner 406 associates the direction of rotation of the tube 422 with raising or lowering the example covering 420.

The example tube angular position determiner 408 determines an angular position of the tube 422 relative to a reference point, a reference position and/or a frame of reference (e.g., a gravitational field vector of Earth, an indicator (e.g., a marking, a light, a magnetic field, etc. on the tube 422 and/or other portion of the architectural opening covering assembly, a wall, an architectural opening frame (e.g., the example first frame 226 of FIG. 2, the example second frame 228 of FIG. 2, etc.), and/or any other structure). In some examples, the tube angular position determiner 408 determines the angular position of the tube 422 based on tube position information communicated by the tube angular position sensor 426 and/or the rotational direction of the tube 422 determined by the example tube rotational direction determiner 406. In some examples, the tube angular position determiner 408 processes the tube position information (e.g., performs geometric calculations, converts a current signal to a voltage signal, etc.) to determine the angular position of the tube 422.

The example covering position determiner 410 of FIG. 4 determines a position of the covering 420 relative to a reference position (e.g., a previously stored position, a lower limit position, an upper limit position, and/or any other reference position). In some examples, the covering position determiner 410 determines the position of the covering 420 based on an angular displacement (e.g., an amount of rotation) of the tube 422 from the reference position. In some examples, the covering position determiner 410 determines that a given position of the covering 420 is the reference position based on a command from the first input device 416 and/or the second input device 418. For example, the first input device 416 and/or the second input device 418 communicates an instruction to the controller 400 to establish a reference position at a position of the covering 420 at a time when the instruction is received. In some examples, in response to the instruction, the covering position determiner 410 establishes the reference position and substantially continuously monitors subsequent positions of the covering 420 relative to the reference position. In some examples, the covering position determiner 410 determines the position of the covering 420 in units of degrees of rotation (e.g., 30 degrees, 720 degrees, etc.) of the tube 422 relative to the reference position, a number of rotations (e.g., 1, 2, 3, 3.4, etc.) of the tube 422 from the reference position and/or any other unit of measurement.

The example tube rotational speed determiner 412 of FIG. 4 determines a speed at which the example covering 420 is to move during operation of the example architectural opening covering assembly. In some examples, the example tube rotational speed determiner 412 determines the speed at which the example covering 420 is to move by determining a speed at which the motor controller 404 is to cause the motor 424 to rotate the tube 422. In the illustrated example, the tube rotational speed determiner 412 determines the speed of rotation of the tube 422 based on a value (e.g., a number of rotations, a distance measurement, and/or any other value.) corresponding to a position of the covering 420.

In some examples, the tube rotational speed determiner 412 determines the speed of rotation of the tube 422 based on the position (e.g., a speed setting position) of the covering 420 relative to a reference position. In some examples, the first input device 416 and/or the second input device 418 communicates a command to the instruction processor 402 to establish (e.g., determine, set, adjust and/or change) the speed of rotation of the tube 422 based on the position of the covering 420 relative to the reference position at a given time. Based on the distance between the position of the covering 420 and the reference position (e.g., a number of rotations of the tube 422 away from the reference position) at the given time (e.g., when the command is received), the tube rotational speed determiner 412 determines (e.g., calculates) the speed at which the covering 420 is to move during operation of the example architectural opening covering assembly.

In some examples, the tube rotational speed determiner 412 determines the speed of rotation of the tube 422 based on a predetermined amount of time in which the covering 420 is to move from the speed setting position (e.g., a position of the tube 422 at a time when the command is received to the reference position). For example, if the predetermined amount of time is fifteen seconds and the covering 420 is two rotations of the tube 422 from the reference position when the example controller 400 receives a command to establish the speed, the tube rotational speed determiner 412 determines that the tube 422 is to rotate two rotations per fifteen seconds (i.e., eight revolutions per minute). In this case, during subsequent operation of the example architectural opening covering assembly (e.g., raising the covering 420, lowering the covering 420, etc.), the example motor controller 404 controls the motor 424 to rotate the tube 422 at two rotations per fifteen seconds. Other examples use other predetermined amounts of time (e.g., 10 seconds, 20 seconds, 30 seconds, etc.) to determine the speed of rotation of the tube 422 based on the speed setting position of the tube 422. In some examples, the tube rotational speed determiner 412 uses a predetermined amount of time stored in the memory 414.

The example memory 414 of FIG. 4 organizes and/or stores information such as, for example, tube position information generated by the example tube angular position sensor 426, a position of the covering 420, a direction or rotation of the tube 422 to raise the covering 420, a direction of rotation of the tube 422 to lower the covering 420, one or more reference positions of the covering 420 (e.g., a fully unwound position, an upper limit position, a lower limit position, etc.), a speed at which the tube 422 is to rotate during operation of the example architectural opening covering assembly, one or more predetermined amounts of time, one or more instructions or commands corresponding to signals (e.g., a number of polarity changes) to be communicated by of the first input device 416 and/or the second input device 418, and/or any other information that may be utilized during the operation of the example architectural opening covering assembly.

While an example manner of implementing the example controller 122 of FIG. 1, the example controller 216 of FIGS. 2-3 and/or the example controller 218 of FIGS. 2-3 is illustrated in FIG. 4, one or more of the elements, processes and/or devices illustrated in FIG. 4 may be combined, divided, re-arranged, omitted, eliminated and/or implemented in any other way. Further, the example instruction processor 402, the example motor controller 404, the example tube rotational direction determiner 406, the example tube angular position determiner 408, the example covering position determiner 410, the example tube rotational speed determiner 412, the example memory 414, the example first input device 416, the example second input device 418, the example tube angular position sensor 426 and/or, more generally, the example controller 400 of FIG. 4 may be implemented by hardware, software, firmware and/or any combination of hardware, software and/or firmware. Thus, for example, any of the example instruction processor 402, the example motor controller 404, the example tube rotational direction determiner 406, the example tube angular position determiner 408, the example covering position determiner 410, the example tube rotational speed determiner 412, the example memory 414, the example first input device 416, the example second input device 418, the example tube angular position sensor 426 and/or, more generally, the example controller 400 of FIG. 4 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, instruction processor 402, the example motor controller 404, the example tube rotational direction determiner 406, the example tube angular position determiner 408, the example covering position determiner 410, the example tube rotational speed determiner 412, the example memory 414, the example first input device 416, the example second input device 418, the example tube angular position sensor 426 and/or, more generally, the example controller 400 of FIG. 4 are hereby expressly defined to include a tangible computer readable storage device or storage disk such as a memory, a digital versatile disk (DVD), a compact disk (CD), a Blu-ray disk, etc. storing the software and/or firmware. Further still, the example controller 400 of FIG. 4 may include one or more elements, processes and/or devices in addition to, or instead of, those illustrated in FIG. 4, and/or may include more than one of any or all of the illustrated elements, processes and devices.

Figure 5:
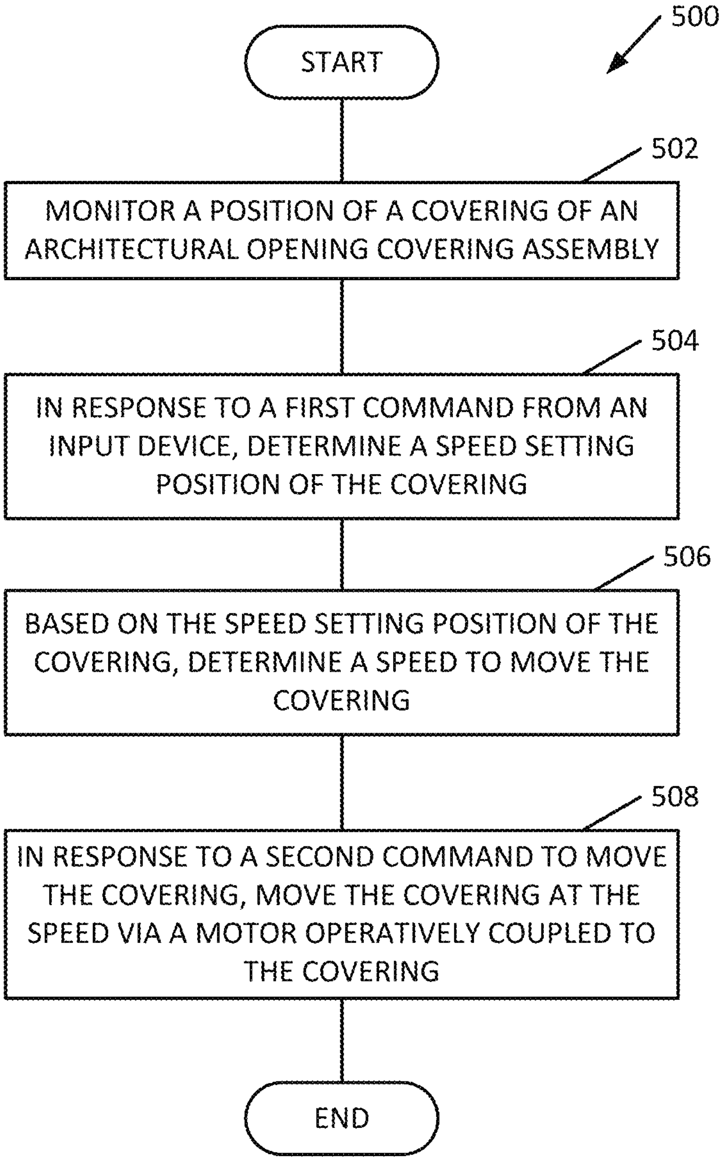
FIG. 5 is a flowchart representative of example machine readable instructions for implementing the example controller of FIG. 4.

A flowchart representative of example machine readable instructions for implementing the example controller 400 of FIG. 4 is shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 4, many other methods of implementing the example controller 400 may alternatively be used. For example, the order of execution of the blocks may be changed, and/or some of the blocks described may be changed, eliminated, or combined.

As mentioned above, the example process of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example process of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example program 500 of FIG. 5 begins at block 502 when the covering position determiner 410 monitors a position of the covering 420 of an architectural opening covering assembly (e.g., the example architectural opening covering assembly of FIG. 1, the example first architectural opening covering 200 assembly of FIG. 2, the example second architectural opening covering assembly 202 of FIG. 2, etc.). In some examples, the controller 400 receives a signal from the first input device 416 and/or the second input device 418 communicating a command to enter a speed setting mode. The example instruction processor 402 of FIG. 4 processes the signal, and the example controller 400 enters the speed setting mode and monitors the position of the covering 420 relative to a reference position such as, for example, a lower limit position, an upper limit position, etc. In some examples, while the controller 400 is in the speed setting mode, the covering 420 is moved via the first input device 416 and/or the second input device 418 (e.g., a user actuates a cord, actuates a switch, etc.), and the example covering position determiner 310 monitors the movement of the covering 410 based on tube position information generated via the tube angular position sensor 426. In some examples, the controller 400 determines, sets and/or stores the reference position in response to the command to enter the speed setting mode. In other examples, the reference position is previously established in a programming or calibration mode.

At block 504, the covering position determiner 410 determines a speed setting position of the covering 420 in response to a first command from the first input device 416 and/or the second input device 418 (e.g., the input device 138 of FIG. 1, the central input device 346 of FIG. 2, etc.). In some examples, the speed setting position is a position of the covering 420 relative to the reference position at a time when the example controller 400 receives the first command.

At block 506, based on the speed setting position of the covering 420, the tube rotational speed determiner 412 determines a speed at which to move the covering 420. In some examples, the tube rotational speed determiner 412 determines the speed to move the covering 420 based on a distance from the speed setting position to the reference position and a predetermined amount of time (e.g., 10 seconds, 15 seconds, 20 seconds, 30 seconds, etc.). In some examples, the tube rotational speed determiner 412 uses a predetermined amount of time that is stored in the example memory 414. For example, if the distance between the speed setting position and the reference position is one foot and the predetermined amount of time is 15 seconds, the tube rotational speed determiner 412 determines that the speed to move the covering 420 is one foot per fifteen seconds (i.e., 4 feet per minute).

In some examples, the tube rotational speed determiner 412 determines the distance between the speed setting position and the reference position by determining a number of rotations of the tube 422 to move the covering 420 from the speed setting position to the reference position. For example, if the reference position is one rotation of the tube 422 in a first direction from a fully unwound position of the covering 420, and the covering position determiner 412 determines that the speed setting position is five rotations of the tube 422 in the first direction from the fully unwound position, the distance between the speed setting position and the reference position is four rotations of the example tube 422. In some examples, the tube rotational speed determiner 412 determines the speed at which to move the covering 420 by dividing the number of rotations by the predetermined amount of time. For example, if the tube rotational speed determiner 412 determines that the distance corresponds to four rotations and the predetermined amount of time is 15 seconds, the tube rotational speed determiner 412 determines the speed to move the covering 420 is four rotations of the tube 422 per fifteen seconds (i.e., 16 rotations of the tube per minute). In some examples, the tube rotational speed determiner 412 stores the speed in the memory 414.

At block 508, in response to a second command from the first input device 416 and/or the second input device 418 to move the covering 420 (e.g., raise or lower the covering 420), the example motor controller 404 of FIG. 4 sends a signal to the motor 424 to move the covering at the determined speed. For example, the motor controller 404 sends a signal to the motor 424 to rotate the tube 422 at a speed of four rotations per fifteen seconds. In some examples, in response to the second command and/or another command, the example controller 400 exits the speed setting mode.

Figure 6:
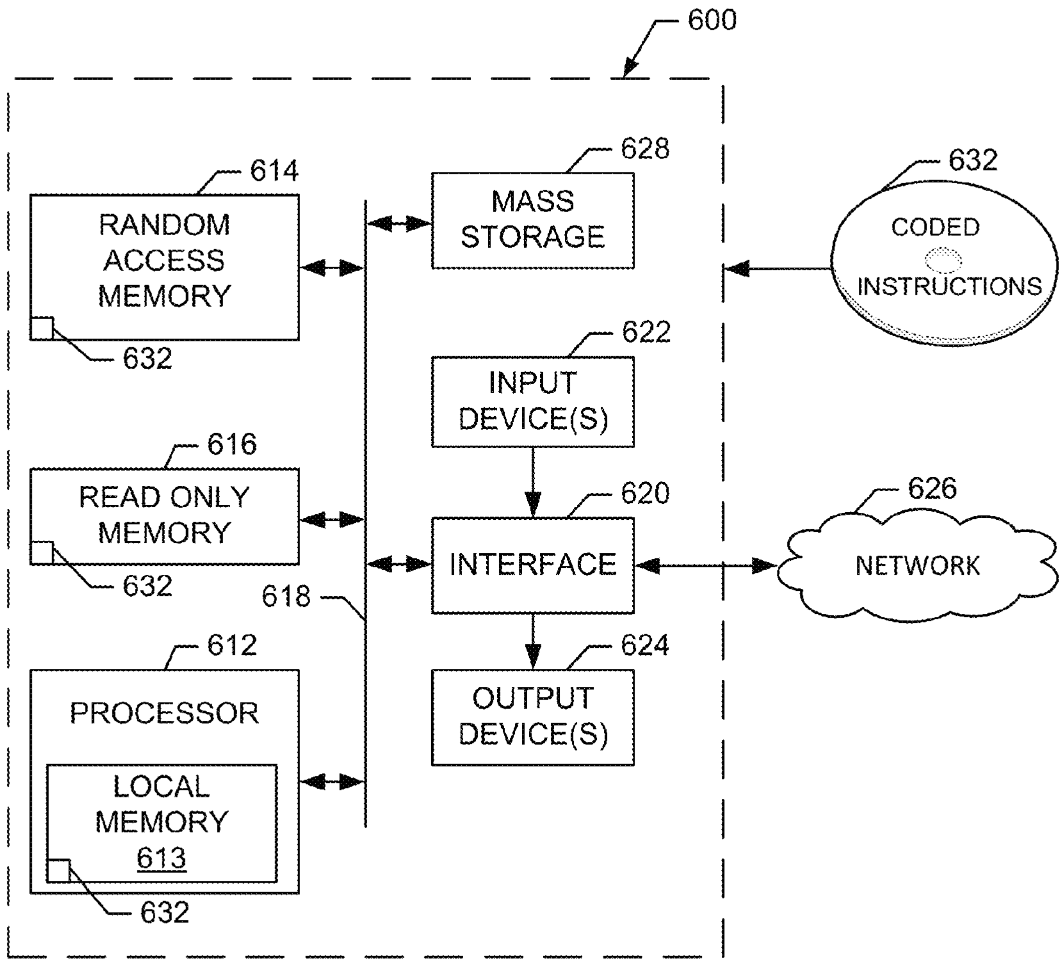
FIG. 6 is a block diagram of an example processor platform to execute the machine readable instructions of FIG. 5 to implement the example controller of FIG. 4.

FIG. 6 is a block diagram of an example processor platform 600 capable of executing the instructions of FIG. 5 to implement the example controller 400 of FIG. 4. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a switch, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a light emitting diode (LED), and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD From the foregoing, it will appreciate that the above disclosed methods, apparatus, systems and articles of manufacture enable a speed of a covering of an architectural opening covering assembly to be determined, set and/or stored based on a position of the covering. In this manner, speeds at which coverings of a plurality of architectural opening covering assemblies, which may include tubes having different sizes, move during operation may be easily coordinated (e.g., synchronized) by adjusting the positions of the coverings relative to reference positions and/or each other. Thus, the speeds may be set based on a visual appearance of one or more architectural opening covering assemblies (e.g., without a user having knowledge and/or concern for characteristics of the architectural opening covering assemblies such as a size of a tube.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method, comprising:

in response to a first command to store a speed at which an architectural opening covering assembly is to be driven via a motor:

identifying, via an instruction executed by a processor, a current position of the covering as a reference position; and storing, via an instruction executed by the processor, the speed at which the covering is to be driven based on the reference position; and in response to a second command to move the covering, operating the motor to move the covering at the stored speed.

2. The method of claim 1, wherein the reference position is a first reference position, and the storing of the speed includes determining a distance between the first reference position and a second reference position.

3. The method of claim 2, wherein the storing of the speed includes determining a number of revolutions of a tube operatively coupled to the covering to move the covering from the second reference position to the first reference position.

4. The method of claim 3, wherein the storing of the speed includes dividing the number of revolutions by a period of time.

5. The method of claim 1, wherein the identifying of the position includes determining an angular position of a tube operatively coupled to the covering.

6. The method of claim 5, wherein the identifying of the position includes determining the angular position of the tube via a gravitational sensor coupled to the tube.

7. A tangible computer readable storage medium comprising instructions that, when executed, cause a machine to at least:

in response to a first command to store a speed at which an architectural opening covering assembly is to be driven via a motor:

determine a distance of a portion of the covering from a reference position; and store the speed at which the covering is to move via a motor based on the distance; and in response to a second command to move the covering, operate the motor to move the portion of the covering at the stored speed.

8. The tangible computer readable storage medium of 7, wherein the instructions, when executed, cause the machine to store the speed by determining a number of rotations of a tube operatively coupled to the covering to move the covering the distance.

9. The tangible computer readable storage medium of 8, wherein the instructions, when executed, cause the machine to store the speed by dividing the number of rotations by a period of time.

10. The tangible computer readable storage medium of claim 8, wherein the instructions, when executed, cause the machine to operate the motor by communicating a signal to the motor to cause the motor to rotate the tube at a speed corresponding to the number of rotations divided by a period of time.

11. The tangible computer readable storage medium of claim 7, wherein the instructions, when executed, cause the machine to enter a speed setting mode and monitor a position of the covering.

12. An apparatus, comprising:

a motor operatively coupled to a tube of an architectural opening covering assembly, the tube supporting an architectural opening covering;

a sensor to determine a position of the tube; and a controller to:

in response to a first command to store a speed at which an architectural opening covering assembly is to be driven via the motor, store the speed at which the motor is to rotate the tube based on the position of the tube; and in response to a second command to move the covering, operate the motor to rotate the tube at the stored speed.

13. The apparatus of claim 12, wherein the sensor includes a gravitational sensor.

14. The apparatus of claim 12, further including an input device operatively coupled to at least one of the tube or the controller, the input device to be operated to selectively raise or lower the covering.

15. The apparatus of claim 14, further including a second input device communicatively coupled to the controller.

16. The apparatus of claim 12, wherein the controller is to determine the speed based on the position of the tube relative to a reference position and a number of revolutions of the tube to rotate the tube from the position to reference position.

17. A controller of an architectural opening covering assembly, the architectural opening covering assembly having a motor to rotate a tube, and a covering at least partially wound around the tube, the controller comprising:

a tube angular position determiner to, in response to a first command to store a speed at which the motor is to rotate the tube, determine a position of the tube;

a tube rotational speed determiner to, in response to the first command, store the speed based on the position of the tube relative to a reference position; and a motor controller to, in response to a second command to rotate the motor, control the motor to rotate the tube at the stored speed.

18. The controller of claim 17, wherein the tube angular position determiner is to determine the position of the tube based on tube position information generated via a gravitational sensor.

19. The controller of claim 17, further including an instruction processor to process commands from an input device.

20. The controller of claim 17, wherein the tube rotational speed determiner is to determine the speed by determining a number of revolutions of the tube from the position to the reference position.

21. The controller of claim 20, wherein the tube rotational speed determiner is to determine the speed by dividing the number of revolutions by a period of time.

* * * * *